United States Patent
Makarov

(10) Patent No.: US 7,764,937 B2
(45) Date of Patent: *Jul. 27, 2010

(54) FREQUENCY ERROR ESTIMATION AND CORRECTION

(75) Inventor: Aleksej Makarov, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/235,757

(22) Filed: Sep. 23, 2008

(65) Prior Publication Data

US 2009/0017768 A1 Jan. 15, 2009

Related U.S. Application Data

(60) Division of application No. 11/480,205, filed on Jun. 29, 2006, now Pat. No. 7,430,402, which is a continuation of application No. 10/154,233, filed on May 22, 2002, now Pat. No. 7,075,948.

(51) Int. Cl.
*H04B 17/00* (2006.01)
*H04B 1/18* (2006.01)
*H04B 1/00* (2006.01)
*H03D 3/22* (2006.01)
*H04L 27/22* (2006.01)

(52) U.S. Cl. .................. 455/130; 455/67.11; 455/164.1; 455/182.1; 455/336; 375/137; 375/145; 375/149; 375/325; 375/329; 370/503

(58) Field of Classification Search ............... 455/67.11, 455/67.13, 67.16, 164.1, 164.2, 182.1, 182.2, 455/192.1–192.2, 336; 375/137, 145, 148–149, 375/325, 326, 344, 329–333; 370/503–520
See application file for complete search history.

(56) References Cited

U.S. PATENT DOCUMENTS

| | | | |
|---|---|---|---|
| 5,081,652 | A | 1/1992 | Farahati et al. |
| 5,574,399 | A | 11/1996 | Oura et al. |
| 5,610,949 | A | 3/1997 | Petranovich |

(Continued)

FOREIGN PATENT DOCUMENTS

WO WO 94 16512 7/1994

OTHER PUBLICATIONS

Tsui, J., "Digital Techniques for Wideband Receivers", ISBN 0-89006-808-9, Section 10.8, pp. 320-324; Section 10.10, pp. 324-329; 1995.

(Continued)

*Primary Examiner*—Simon D Nguyen
(74) *Attorney, Agent, or Firm*—Lisa K. Jorgenson; Andre M. Szuwalski

(57) ABSTRACT

Counter-clockwise and clockwise quadrant transitions are detected and accumulated with respect to a received complex signal over a certain time period. These transitions may then be compared in order to obtain information indicative of both a magnitude and phase of a carrier frequency error for the received signal. Additionally, zero-crossings of the received complex signal over the same certain time period are detected and accumulated. The accumulated crossings provide information indicative of frequency offset magnitude. The determined magnitude and phase of the frequency error may then be used to adjust a local oscillator frequency to provide for improved receiver performance.

21 Claims, 6 Drawing Sheets

U.S. PATENT DOCUMENTS

| | | | |
|---|---|---|---|
| 5,640,431 A | 6/1997 | Bruckert et al. | |
| 5,732,111 A | 3/1998 | Walley | |
| 5,732,339 A | 3/1998 | Auvray et al. | |
| 5,748,682 A | 5/1998 | Mobin | |
| 5,799,043 A * | 8/1998 | Chang et al. | 375/286 |
| 5,838,737 A | 11/1998 | Yamaguchi et al. | |
| 5,946,360 A | 8/1999 | Habbab et al. | |
| 5,963,582 A * | 10/1999 | Stansell, Jr. | 375/148 |
| 6,134,260 A * | 10/2000 | Bottomley et al. | 375/130 |
| 6,266,361 B1 * | 7/2001 | Huang et al. | 375/140 |
| 6,324,227 B1 * | 11/2001 | Kang et al. | 375/343 |
| 6,463,266 B1 | 10/2002 | Shohara | |
| 6,560,298 B1 | 5/2003 | Froehling et al. | |
| 6,628,926 B1 | 9/2003 | van de Beek et al. | |
| 6,643,678 B2 * | 11/2003 | Van Wechel et al. | 708/530 |
| 6,661,851 B1 * | 12/2003 | Kang | 375/322 |
| 6,704,555 B2 | 3/2004 | Sih et al. | |
| 6,721,296 B2 * | 4/2004 | Ohgoshi et al. | 370/335 |
| 6,891,880 B2 * | 5/2005 | Abraham | 375/142 |
| 6,996,156 B1 | 2/2006 | Ono et al. | |
| 2002/0071502 A1 | 6/2002 | Chan et al. | |
| 2003/0039228 A1 * | 2/2003 | Shiu et al. | 370/331 |
| 2003/0043889 A1 | 3/2003 | Kang et al. | |
| 2003/0045300 A1 | 3/2003 | New | |
| 2003/0128777 A1 | 7/2003 | Linsky et al. | |
| 2003/0142733 A1 * | 7/2003 | Boloorian | 375/148 |
| 2003/0220755 A1 | 11/2003 | Darbel et al. | |

OTHER PUBLICATIONS

Host-Madsen, et al.; "Effects of Sampling and Quantization on Frequency Estimation", IR-S3-SB-9850; Royal Institute of Technology; Sep. 1998.

3nd Generation Partnership Project; Tehnical Specification Group Radio Access Network; Spreading and modulation (FDD), 3GPP Organisational Partners; 3GPP TS 25.213 v3.7.0 (Dec. 2001), (Release 1999).

3rd Generation Partanership Project; Technical Specification Group Radio Access Network; Physical channels and mapping of transport channels onto physical channels (FDD), 3GPP Organizational Partners; 3GPP TS 25.211 v3.9.0 (2002), (Release 1999).

Makarov, A.; Discrete Frequency Tracking in Nonstationary Signals Using Joint Order Statistics Technique; Signal Processing Laboratory, Swiss Federal Institute of Technology, Lausanne; TFTSs '96; pp. 441-445; 1996.

Universal Mobile Telecommunications System (UMTS); Physical layer procedures (FDD) (3G TS 25.214 version 3.1.1 Release 1999) / ETSI TS 125 214 V3.1.1, XX, XX, Jan. 2002, pp. 1-41, XP002207980, p. 38.

Partial European Search Report, EP 03/253183, dated Oct. 31, 2003.

European Search Report and Written Opinion, EP 07 07 5540, dated Sep. 19, 2007.

Wang, "Cell Search in W-CDMA," IEEE Journal on Selected Areas in Communications, vol. 18, No. 8, Aug. 2000.

\* cited by examiner

FREQUENCY ERROR ESTIMATION AND CORRECTION

CROSS-REFERENCE TO RELATED APPLICATION

This application is a divisional of U.S. application for patent Ser. No. 11/480,205, filed Jun. 29, 2006, which is a continuation of U.S. application for patent Ser. No. 10/154,233, filed May 22, 2002, now U.S. Pat. No. 7,075,948 issued Jul. 11, 2006, the disclosures of which are hereby incorporated by reference.

BACKGROUND OF THE INVENTION

1. Technical Field of the Invention

The present invention relates to radio receivers and, in particular, to a system and method for frequency offset estimation.

2. Description of Related Art

The process for radio frequency transmission and reception is well known to those skilled in the art. Basically, at a transmitter, a carrier frequency is generated by a local oscillator and is modulated by a baseband signal. More specifically, two sinusoidal carriers of the same frequency, but having a ninety-degree phase offset, are modulated by the real (I) and imaginary (Q) parts of a complex valued baseband signal. At the receiver, coherent demodulation requires exactly the same carrier frequency and phase. In some radio communication systems, however, a frequency offset error appears in the demodulated baseband signal for one reason, or a combination of several reasons. For example, the local oscillator frequency used in the receiver generally may not exactly match the frequency used by the local oscillator transmitter. Also, if the transmitter or receiver is mobile, the received signal may be affected by a Doppler spread.

When the demodulating frequency generated by the local oscillator at the receiver is not precisely equal to the received frequency of the transmitted signal, the demodulated in-phase and quadrature components (I' and Q') of the baseband signal differ from the transmitted components (I and Q) by a variable phase offset. This results in a steady rotation of the whole I-Q constellation diagram which can adversely impact the accuracy of baseband signal reception and detection. In many mobile communication systems, a predefined word (often referred to as a pilot) signal provides a reference that can be used for frequency offset measurement. Once the offset is measured, the local oscillator at the receiver can be tuned to correct for that offset.

SUMMARY OF THE INVENTION

The present invention is directed to a computationally efficient system and method for measurement of frequency offset error. More specifically, the present invention utilizes measurements made on a demodulated signal (for example, a pilot signal) to determine both a direction and magnitude of the frequency error. A receiver frequency control loop responds to the error sign and magnitude to correct for the frequency error. The pilot signal may comprise a PSK signal.

In accordance with one aspect of the present invention, a sign and magnitude of a frequency error in a received complex signal is measured by detecting at least one quadrant transition of the received complex signal in both directions. The detected transitions are separately accumulated over a time period. By comparing the accumulated quadrant transitions, a difference value is obtained. The sign of that difference value provides the frequency error sign, and the magnitude of that difference value provides information indicative of the frequency error magnitude. A receiver frequency control loop responds to the error sign and magnitude to correct for the frequency error.

In accordance with another aspect of the present invention, a sign and magnitude of a frequency error in a received complex signal is measured by detecting at least one quadrant transition of the received complex signal as well as at least one zero-crossing transition. The detected transitions are separately accumulated over a time period. By comparing the accumulated net number of quadrant transitions, information indicative of frequency error sign may be obtained. Furthermore, the accumulated zero-crossing transitions provide information indicative of the frequency error magnitude. A receiver frequency control loop responds to the error sign and magnitude to correct for the frequency error.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Consider an input signal y(k) represented in the following format:

$$y(k) = b(k) A e^{j(\phi(k) + \Phi(k) + \omega_e k)} + \eta(k)$$

wherein: $Ae^{j\phi(k)}$ is the pilot sequence;

A is a real scalar value;

$e^{j\Phi(k)}$ is the channel phase distortion;

b(k) the channel amplitude distortion;

$\omega_e$ is the frequency error offset; and

η(k) is a complex noise term including all interferences, plus additive white Gaussian noise (AWGN), and has low power compared to the total power of y(k). Typically, the pilot sequence symbols used are all identical. For example, in UMTS-FDD, each of the pilot QPSK components carry all ones, and hence $Ae^{j\Phi(k)}$ can be expressed as:

$$\sqrt{2}\,e^{j\frac{\pi}{4}}$$

The QPSK components contain a phase error that is, in the case of a frequency error $\omega_1-\omega$, variable and amounts to $(\omega_1-\omega)t+\phi$. Here, $\omega_1$ the local oscillator angular frequency and $\omega=2\pi F_c$, where $F_c$ is the center frequency of the received signal. The consequence is that the received phase components I' and Q' contain variable mixtures of original QPSK components I and Q where:

$I'(k)=Re\{y(k)\}=0.5A\{I(k)\cos\{(\omega_1-\omega)k+\phi\}-Q(k)\sin\{(\omega_1-\omega)k+\phi\}\}$; and $Q'(k)=Im\{y(k)\}=0.5A\{I(k)\sin\{(\omega_1-\omega)k+\phi\}+Q(k)\cos\{(\omega_1-\omega)k+\phi\}\}$ and further where I'(k) and Q'(k) vary in time. The mixing of original phase components is irrelevant in this case because of trivial information carried by each of them (for example, all ones in the case of a UMTS-FDD pilot signal). The time variation is to be analyzed, however, because the all-ones components of the pilot that are impaired by a constant frequency error behave as sine waves whose frequency is equal to the frequency offset that must be determined. Thus, the frequency offset estimation comprises the finding the $(\omega_1-\omega)$ term.

Figure 1:
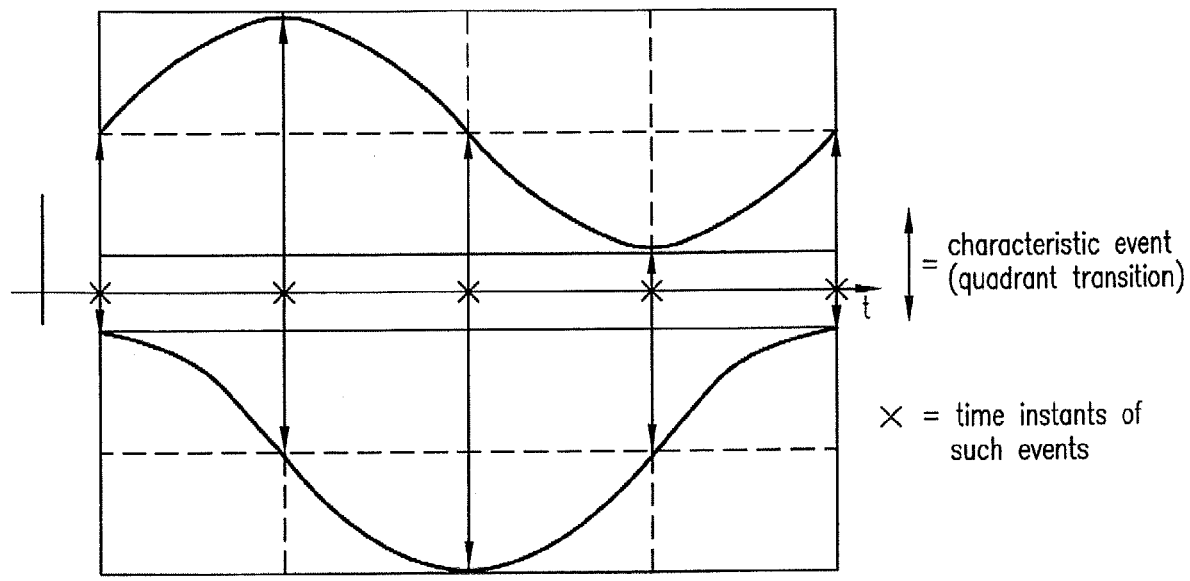
FIG. 1 is a timing diagram illustrating in-phase and quadrature components.

The system and method of the present invention for frequency offset determination is based on an event counting technique. Namely, a frequency offset causes the above-referenced phase components I'(k) and Q'(k) to fluctuate as sine waves. Each 0 to $2\pi$ cycle can be characterized by a characteristic event. In one aspect of the present invention, the characteristic event is a simultaneous appearance of a zero crossing on one component (for example, I'(k)) and of an extremum on the other component (for example, Q'(k)), as shown in FIG. 1. In another aspect of the present invention, the characteristic event is a zero crossing on one (or both) component (s). Due to the $\pi/2$ phase delay between the I'(k) and Q'(k) components, the extremum can be assumed to be detected on one component when both (1) the sign of this component does not change, and (2) a zero crossing is detected on the other component. It is thus recognized that both events (1) and (2) can be tracked simply from detection of possible sign changes. Additionally, for purposes of the frequency offset detection operation, the I'(k) and Q'(k) components can be quantized with only one bit (i.e., the sign bit). The one bit and sign change characteristics lead to several efficient designs for offset detection and measurement.

Figure 2:
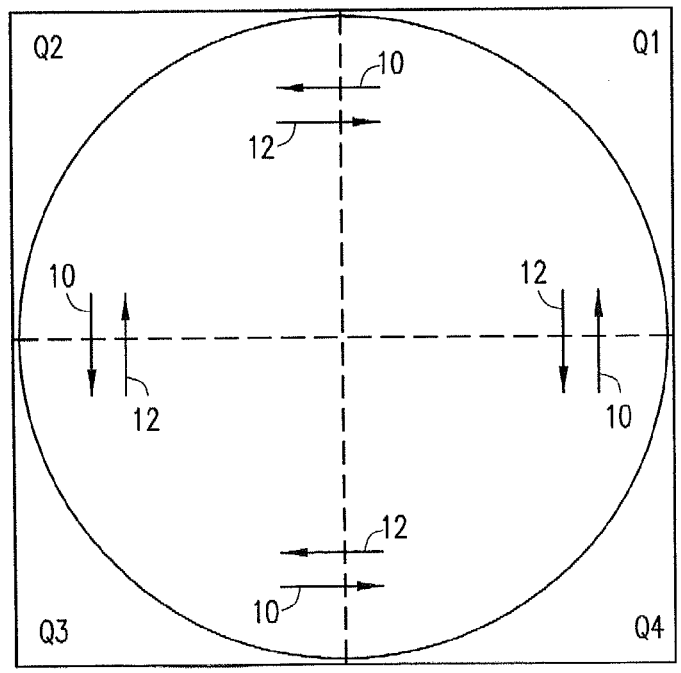
FIG. 2 is a diagram synthetically illustrating one bit counting of characteristic events (such as, for example, quadrant transitions)

Reference is now made to FIG. 2 wherein there is shown a diagram synthetically illustrating one bit event counting. The arrows 10 pointing in a counterclockwise direction correspond to a sequence of events caused by a positive frequency offset, while the arrows 12 pointing in the clockwise direction mark a sequence of events caused by a negative frequency offset. For example, the top arrow 10 corresponds to a transition (or crossing) from a first quadrant to a second quadrant of the I'-Q' QPSK constellation due to a positive frequency offset, while the top arrow 12 corresponds to a transition from the second to the first quadrant due to a negative frequency offset, each arrow being characterized by a zero crossing for the I' component and no sign change for the Q' component.

Similar relationships can be identified for each of the other quadrant transitions.

Figure 3A:
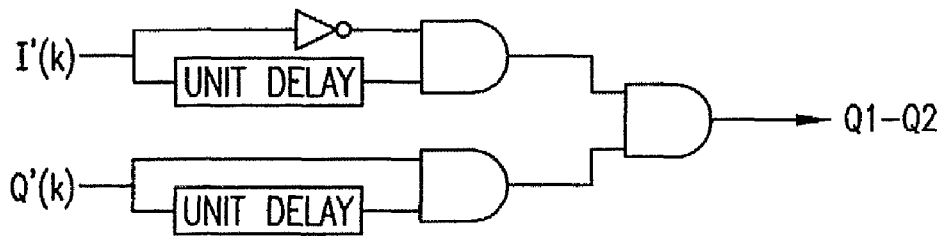
FIGS. 3A-3D are logic diagrams illustrating single sign bit counter-clockwise transition detection.

Remembering now that the I'(k) and Q'(k) components can be quantized with only one bit (i.e., the sign bit), it will be recognized that each of the transitions can be detected by applying an appropriate logical analysis of events (1) and (2) described above against that bit. Consider first, for example, the arrows 10 defining the transitions in the counter-clockwise direction, and assume complementary logic (where the most significant bit (MSB) of a non-negative number is "1", and otherwise "0"). In this context, the transition from the first to the second quadrant is detected if the following logical expression is true (i.e., "1"):

{I'(k−1) AND NOT(I'(k))} AND {Q'(k−1) AND Q'(k)};

wherein "k" is the current sample and "k−1" is the immediately preceding sample. Thus, if the MSB of the immediately preceding I' sample is "1", AND the MSB of current I' sample is "0", AND if the MSB of the immediately preceding Q' sample is "1", AND the MSB of current Q' sample is "1", THEN the I'-Q' QPSK constellation is rotating in the counter-clockwise direction (due to a positive frequency offset condition) and has just crossed from the first quadrant to the second quadrant. A logic circuit implementing this logical expression is shown in FIG. 3A. The transition from the second to the third quadrant is detected if the following logical expression is true (i.e., "1"):

{Q'(k−1) AND NOT(Q'(k))} AND {NOT(I'(k−1)) AND NOT(I'(k))}.

Figure 3B:
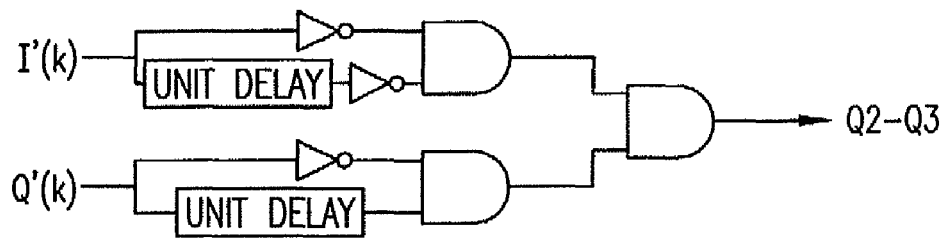

A logic circuit implementing this logical expression is shown in FIG. 3B. The transition from the third to the fourth quadrant is detected if the following logical expression is true (i.e., "1"):

{NOT(I'(k−1)) AND I'(k)} AND {NOT(Q'(k−1)) AND NOT(Q'(k))}.

Figure 3C:
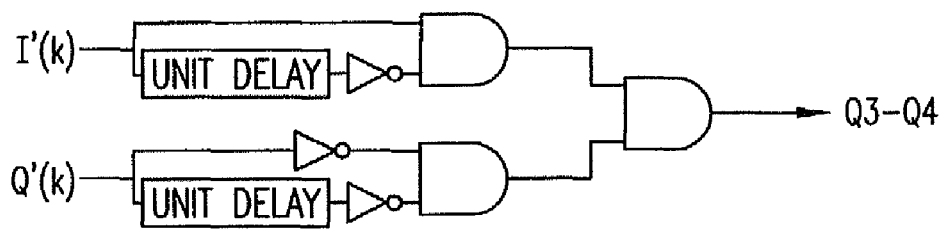

A logic circuit implementing this logical expression is shown in FIG. 3C. Lastly, the transition from the fourth to the first quadrant is detected if the following logical expression is true (i.e., "1"):

{NOT(Q'(k−1)) AND Q'(k)} AND {I(k−1) AND I'(k)}.

Figure 3D:
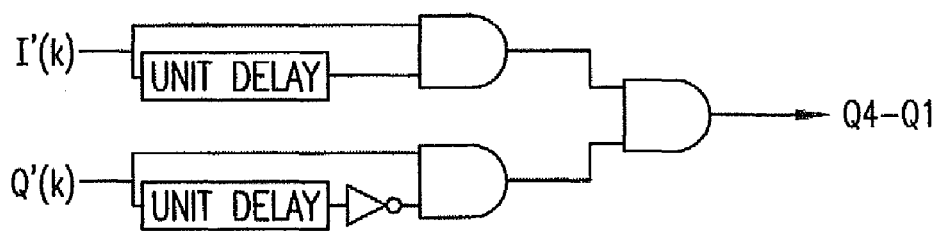

A logic circuit implementing this logical expression is shown in FIG. 3D. For each of the logical expressions recited above for detecting counter-clockwise direction transitions, the first {−} part of the expression reflects the zero crossing event (2) on one component, and the second {−} part of the expression reflects the no-sign-change event (1) on the other component.

Figure 4A:
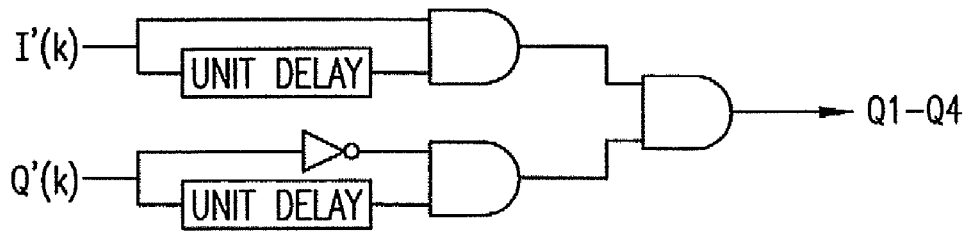
FIGS. 4A-4D are logic diagrams illustrating single sign bit clockwise transition detection.

Consider now, for example, the arrows 12 defining the transitions in the clockwise direction, and again assume complementary logic. In this context, the transition from the first to the fourth quadrant is detected if the following logical expression is true (i.e., "1"):

{Q'(k−1) AND NOT(Q'(k))} AND {I'(k−1) AND I'(k)};

wherein "k" is the current sample and "k−1" is the immediately preceding sample. Thus, if the MSB of the immediately preceding Q' sample is "1", AND the MSB of current Q' sample is "0", AND if the MSB of the immediately preceding I' sample is "1", AND the MSB of current I' sample is "1", THEN the I'-Q' QPSK constellation is rotating in the clockwise direction (due to a negative frequency offset condition) and has just crossed from the first quadrant to the fourth quadrant. A logic circuit implementing this logical expression is shown in FIG. 4A. The transition from the fourth to the third quadrant is detected if the following logical expression is true (i.e., "1"):

{I'(k−1) AND NOT(I'(k))} AND {NOT(Q'(k−1)) AND NOT(Q'(k))}.

Figure 4B:
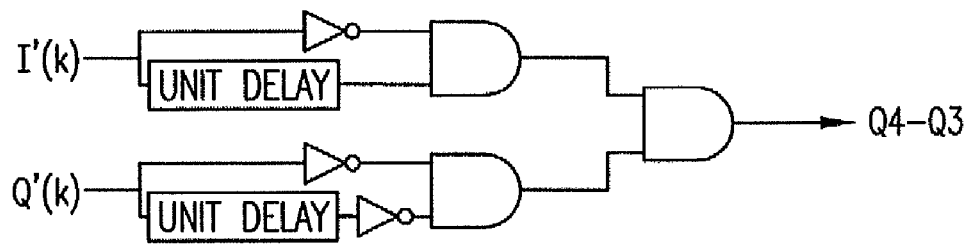

A logic circuit implementing this logical expression is shown in FIG. 4B. The transition from the third to the second quadrant is detected if the following logical expression is true (i.e., "1"):

{NOT(Q'(k−1)) AND Q'(k)} AND {NOT(I'(k−1)) AND NOT(I'(k))}.

Figure 4C:
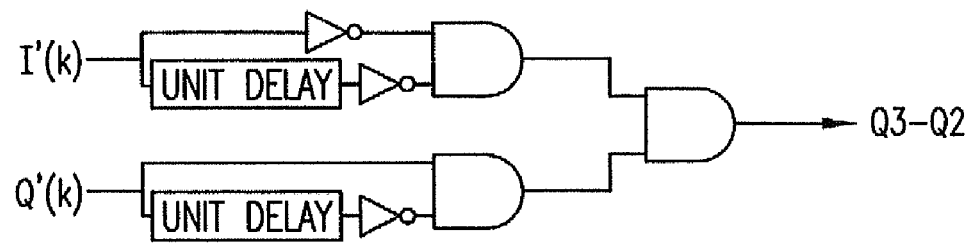

A logic circuit implementing this logical expression is shown in FIG. 4C. Lastly, the transition from the second to the first quadrant is detected if the following logical expression is true (i.e., "1"):

{NOT(I'(k−1)) AND I'(k)} AND {Q'(k−1) AND Q'(k)}.

Figure 4D:
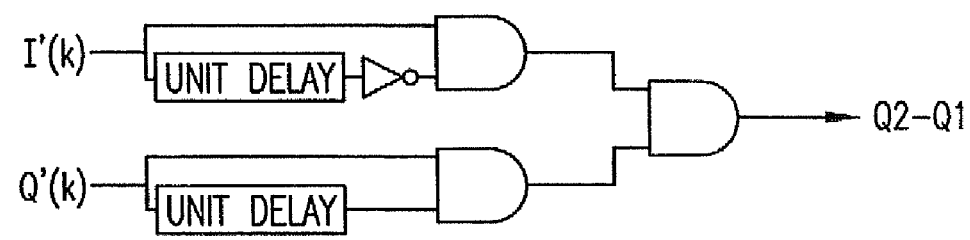

A logic circuit implementing this logical expression is shown in FIG. 4D. For each of the logical expressions recited above for detecting clockwise direction transitions, the first {−} part of the expression reflects the zero crossing event (2) on one component, and the second {−} part of the expression reflects the no-sign-change event (1) on the other component.

By detecting the occurrences of these transitions, information relating to the cycling of the I'-Q' QPSK constellation due to a frequency offset may be obtained (i.e., the existence of an offset is identified by detecting any transition, and the detection of a certain transition provides an indication of direction of rotation). More specifically, by counting the number and type of these transitions over a certain time period information concerning the magnitude and direction of the frequency offset may be obtained. For example, the count of the net number of transitions (N) provides direction and is proportional, after a measurement interval (t), to the residual frequency offset (Δf) where:

$$\Delta f = \frac{N}{t}$$
$$= \frac{N * R_b}{N_{bits}}$$

wherein: $R_b$ is the bit rate on a single QPSK component; and $N_{bits}$ is the number of processed I' or Q' bits, on a single component, during the measurement interval (i.e., the data block length in samples).

Figure 5:
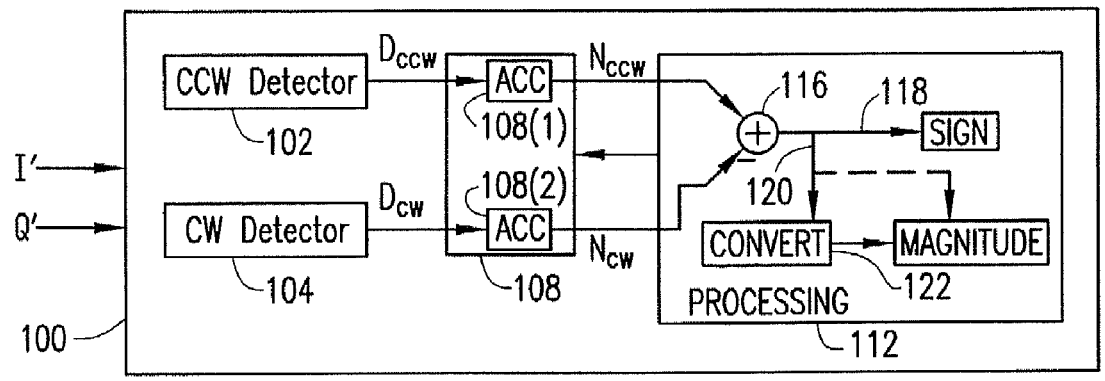
FIG. 5 is a block diagram of a frequency offset detector in accordance with a first embodiment of the present invention.

Reference is now made to FIG. 5 wherein there is shown a block diagram of a frequency offset detector 100 in accordance with a first embodiment of the present invention. The detector 100 includes a counter-clockwise transition detector 102 and a clockwise transition detector 104. The counter-clockwise transition detector 102 implements one or more of the counter-clockwise transition detection logical expressions noted above (and discussed in connection with the logical implementations of FIGS. 3A-3D, or their equivalents). The clockwise transition detector 104 implements a corresponding one or more of the clockwise transition detection logical expressions noted above (and discussed in connection with the logical implementations of FIGS. 4A-4D, or their equivalents). By "corresponding" it is meant that which ever one or more of the transition detection expressions that is implemented by the counter-clockwise transition detector 102, the clockwise transition detector 104 should preferably implement the corresponding opposite transition detection expressions. For example, if the counter-clockwise transition detector 102 implements the logical expression for detecting a first to second quadrant transition, the clockwise transition detector 104 should preferably implement the corresponding opposite logical expression for detecting a second to first quadrant transition.

The input to the counter-clockwise transition detector 102 and the clockwise transition detector 104 comprises a single quantization bit for each of the received I' and Q' signals. More specifically, in a preferred embodiment of the detector 100, the input comprises the sign bit (the most significant bit in this instance) of the received I' and Q' signals. Although the expressions recited above assume complementary logic, it will be understood that the input and the detection expressions may implement other equivalent formatting.

The output from each of the counter-clockwise transition detector 102 and the clockwise transition detector 104 is a signal D ($D_{ccw}$ for the detector 102 and $D_{cw}$ for the detector 104) that when active indicates a detected occurrence of a transition event for the received signal. Active in this case could comprise either active high (i.e., logical "1") or active low (i.e., logical "0") as desired for a given implementation.

The signals D are accumulated in a counter 108 that includes a counter-clockwise accumulator 108(1) (counting the active signals $D_{ccw}$ over a given time period) and a clockwise accumulator 108(2) (counting the active signals $D_{cw}$ over the same given time period). A reset signal 110 is used to reset the counter 108 at the start of each new time period. The output from the counter 108 at the expiration of each time period is a count N ($N_{ccw}$ for the counter-clockwise accumulator 108(1) and $N_{cw}$ for the clockwise accumulator 108(2)) that represents the sum number of occurrences of a detected transition event in each direction for the received signal during the given time period.

A processing component 112 receives the counts N and mathematically operates on those counts to determine information that is at least indicative of, if not explicitly defining, the magnitude and sign of the frequency offset. With respect to the sign, the processing component 112 includes a subtractor 116 that subtracts the count $N_{cw}$ of the clockwise accumulator 108(2) from the count $N_{ccw}$ of the counter-clockwise accumulator 108(1). The processing component then examines the sign portion 118 (i.e, the most significant bit) of the subtractor 116 output to identify the sign of the frequency offset. For example, if the sign 118 is positive, then the sign of the frequency offset is also positive. Conversely, if the sign 118 is negative, then the sign of the frequency offset is negative.

With respect to magnitude, the processing component 112 examines the value portion 120 (i.e., the numerical result of the subtraction $N_{dif} = N_{ccw} - N_{cw}$) of the subtractor 116 output. The difference value $N_{dif}$ is indicative of the offset magnitude (see, dotted line in FIG. 5) and may be used directly for other operations such as frequency offset correction. If desired, the difference value may be converted 122 by the processing component 112 into a frequency magnitude by recognizing that the net number of transitions during the given time period is proportional to the frequency offset in accordance with:

$$\Delta f = \frac{N_{dif}/n}{t}$$

$$= \frac{N_{dif} * R_b}{n * N_{bits}}$$

wherein: $R_b$ is the bit rate on a single QPSK component (I' or Q');

$N_{bits}$ is the number of processed I' or Q' bits during the time period; and n is the number of corresponding quadrant transitions monitored by the detectors 102 and 104 (for example, if only a first to second transition and corresponding second to first transition were monitored, then n=1).

This conversion 122 thus comprises the multiplication of the value 120 by a chosen constant to produce the frequency offset magnitude.

A noted benefit concerning the operation of the embodiment of FIG. 3 is its behavior in the presence of pure noise. Since pure noise may be characterized by a relatively equal number of clockwise and counter-clockwise transitions, these cancel out in the comparator 116 operation ($N_{dif}=N_{ccw}-N_{cw}$), and the result more accurately reflects the frequency offset alone when averaged over time.

There is, however, a drawback with this operation in that the maximum frequency offset that is capable of detection is limited to 1/n of the sampling rate. This can be better understood by reference to a specific example. It is recognized that the maximum frequency offset occurs when $N_{dif}$ increases by one for each signal sample. Take an implementation of the present invention in a UMTS-FDD common pilot channel (C-PICH) scenario where sampling occurs at a rate of 15 kHz. Thus, the time period t contains Ns number of symbols (Ns=t*15,000). The maximum rate of change of $N_{dif}$ is thus Ns quadrant transitions in one direction over the time period t. By replacing $N_{dif}$ by Ns=t*15,0000 in the frequency offset formula set forth above, the following maximum measurable frequency offset (Maxf) calculation results:

$$\text{Max} f = \frac{Ns/n}{t}$$

$$= \frac{t * 15,000}{n * t}$$

$$= \frac{15,000}{n}$$

showing the 1/n of the sampling rate limitation of the FIG. 3 implementation. Any frequency offset above this relationship is erroneously measured, and suffers from the so-called "aliasing effect." It is recognized that in some instances, due to the use of more inexpensive local oscillators in the receiver, an initial frequency offset often times exists that exceeds the (sampling rate)/n limitation.

Figure 6:
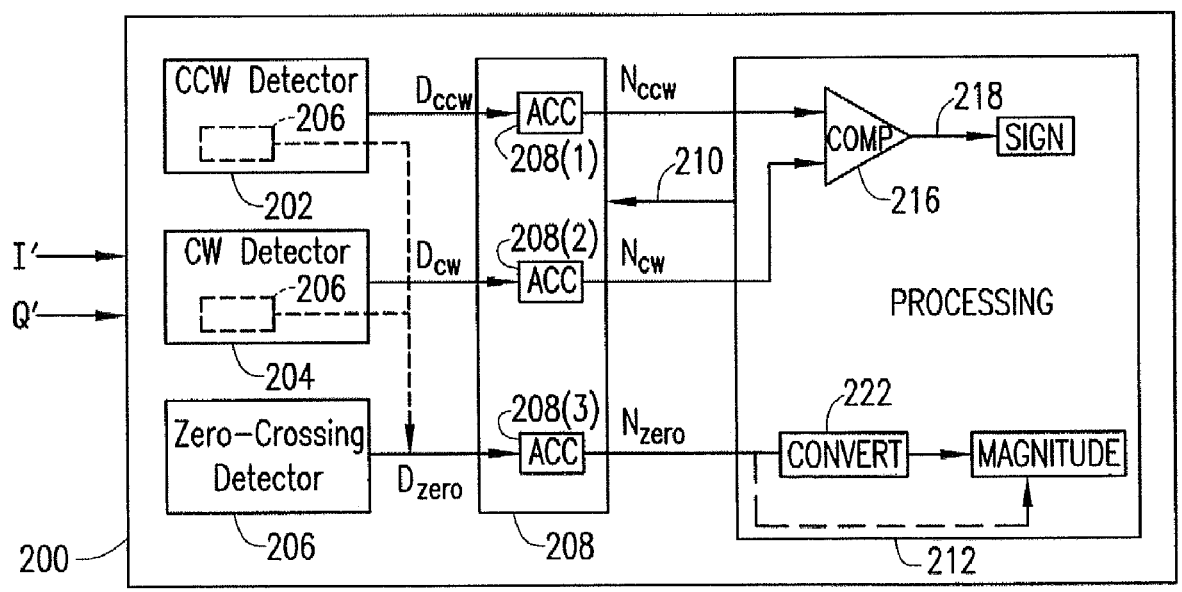
FIG. 6 is a block diagram of a frequency offset detector in accordance with a second embodiment of the present invention.

Reference is now made to FIG. 6 wherein there is shown a block diagram of a frequency offset detector 200 in accordance with a second embodiment of the present invention. The detector 200 includes a counter-clockwise transition detector 202 and a clockwise transition detector 204. The counter-clockwise transition detector 202 implements one or more of the counter-clockwise transition detection logical expressions noted above (and discussed in connection with the logical implementations of FIGS. 3A-3D, or their equivalents). The clockwise transition detector 204 implements a corresponding one or more of the clockwise transition detection logical expressions noted above (and discussed in connection with the logical implementations of FIGS. 4A-4D, or their equivalents). By "corresponding" it is meant that which ever one or more of the transition detection expressions that is implemented by the counter-clockwise transition detector 202, the clockwise transition detector 204 should preferably implement the corresponding opposite transition detection expressions. For example, if the counter-clockwise transition detector 202 implements the logical expression for detecting a first to second quadrant transition, the clockwise transition detector 204 should preferably implement the corresponding opposite logical expression for detecting a second to first quadrant transition.

The detector 200 still further includes a zero-crossing detector 206. The zero-crossing detector 206 may implement a zero-crossing detection portion (for example, the first {-} portion shown above) of any one or more of the transition detection logical expressions noted above (or their equivalents). For example, the expressions for the transitions in the counter-clockwise direction are as follows:

first to second: I'(k-1) AND NOT(I'(k))

second to third: Q'(k-1) AND NOT(Q'(k))

third to fourth: NOT(I'(k-1)) AND I'(k)

fourth to first: NOT(Q'(k-1)) AND Q'(k).

Conversely, the expressions for the transitions in the clockwise direction are as follows:

fourth to third: I'(k-1) AND NOT(I'(k))

first to fourth: Q'(k-1) AND NOT(Q'(k))

second to first: NOT(I'(k-1)) AND I'(k)

third to second: NOT(Q'(k-1)) AND Q'(k).

It will be noted from a review of the above zero-crossing expressions that the same expressions are used in both the clock-wise and counter-clockwise directions, but are reshuffled (for example, first to second and fourth to third are both satisfied when I'(k-1) AND NOT(I'(k)) is logically true). In this scenario, if a given expression is used within the zero-crossing detector, its satisfaction is counted twice (for the same example as above, once as a first to second zero-crossing and again for its matching fourth to third zero-crossing).

The input to the counter-clockwise transition detector 202, the clockwise transition detector 204 and the zero-crossing detector 206 comprises a single quantization bit for each of the received I' and Q' signals. More specifically, in a preferred embodiment of the detector 200, the input comprises the sign bit (the most significant bit in this case) of the received I' and Q' signals. Although the expressions recited above assume complementary logic, it will be understood that the input and the detection expressions may implement other equivalent formatting.

The output from each of the counter-clockwise transition detector 202, the clockwise transition detector 204 and zero-crossing detector 206 is a signal D ($D_{ccw}$ for the detector 202, $D_{cw}$ for the detector 204, and $D_{zero}$ for the detector 206) that when active indicates a detected occurrence of a transition/zero-crossing event for the received signal. Active in this case could comprise either active high (i.e., logical "1") or active low (i.e., logical "0") as desired for a given implementation.

The signals D are accumulated in a counter 208 that includes a counter-clockwise accumulator 208(1) (counting the active signals $D_{ccw}$ over a given time period), a clockwise accumulator 208(2) (counting the active signals $D_{cw}$ over the same given time period), and a zero-crossing accumulator 208(3) (counting the active signals $D_{zero}$ over the same given time period). A reset signal 210 is used to reset the counter 208 at the start of each new time period. The output from the counter 208 at the expiration of each time period is a count N ($N_{ccw}$ for the counter-clockwise accumulator 208(1), $N_{cw}$ for the clockwise accumulator 208(2), and $N_{zero}$ for the zero-crossing accumulator 208(3)) that represents the sum number of occurrences of a detected transition event in each direction and zero-crossing event for the received signal during the given time period.

A processing component 212 receives the counts N and mathematically operates on those counts to determine information that is at least indicative of, if not explicitly defining, the magnitude and sign of the frequency offset. With respect to the sign, the processing component 212 includes a comparator 216 that compares the count $N_{cw}$ of the clockwise accumulator 208(2) with the count $N_{ccw}$ of the counter-clockwise accumulator 208(1) (a subtractor may alternatively be used, with the sign of the value resulting from the subtraction being indicative of offset sign). The processing component then examines the sign output 218 of the comparator 216 output to identify the sign of the frequency offset. For example, if the sign 218 is positive, then the sign of the frequency offset is also positive. Conversely, if the sign 218 is negative, then the sign of the frequency offset is negative.

With respect to magnitude, the sign is disregarded because the zero-crossing detector is detecting an event and counting it twice as both a clockwise zero-crossing and a counter-clockwise zero-crossing (note the example recited above). The count $N_{zero}$ of the zero-crossing accumulator 208(3) is indicative of offset magnitude (see dotted line in FIG. 6) and may be directly used in other operations such as offset correction. Alternatively, the processing component 212 may convert 222 the count $N_{zero}$ of the zero-crossing accumulator 208(3) into a frequency magnitude by recognizing that the number of zero-crossings during the given time period is proportional to the frequency offset in accordance with:

$$\Delta f = \frac{N_{zero}/2n}{t}$$
$$= \frac{N_{zero} * R_b}{2n * N_{bits}}$$

wherein: $R_b$ is the bit rate on a single QPSK component (I' or Q');
$N_{bits}$ is the number of processed I' or Q' bits during the time period;
2 reflects that one crossing is counted twice; and
n is the number of matching zero-crossing transitions monitored by the detector 206 (for example, if only a first to second crossing and matching fourth to third crossing were monitored, then n=1).

Again, this conversion comprises the multiplication by a constant.

Using the zero-crossing implementation discussed above provides for an improvement in the maximum measurable frequency offset (in comparison to the embodiment of FIG. 5). Since sign is ignored by the zero-crossing detector 206, each crossing counts twice (once for clockwise (of one transition) and again for counter-clockwise (of a different transition)). More specifically, it is possible that during one sample change, both I' and Q' may change their sign. Such a change would reflect at least a π phase change in FIG. 2. This would give a Nyquist frequency that is twice as high as that provided with the embodiment of FIG. 5 (where an event was measured by the combination of (1) and (2) which precludes both I' and Q' from changing). The higher Nyquist frequency in essence doubles the maximum frequency offset that can be detected. This can be better understood by reference to a specific example. It is recognized that the maximum frequency offset occurs when $N_{zero}$ increases by n for each signal sample (where n is the number of matching zero-crossing detections that are utilized). Take an implementation of the present invention in a UMTS-FDD common pilot channel (CPICH) scenario where sampling occurs at a rate of 15 kHz. Thus, the time period t contains Ns number of symbols (Ns=t*15,000). The maximum rate of change of $N_{zero}$ is thus 2*Ns zero-crossings in any direction over the time period t ("2" because both I' and Q' change sign with the zero-crossing). By replacing $N_{zero}$ by Ns=2*t*15,0000 in the frequency offset formula set forth above, the following maximum frequency offset (Maxf) calculation results:

$$\begin{aligned} \text{Max} f &= \frac{2*Ns/n}{t} \\ &= \frac{2*t*15{,}000}{n*t} \\ &= \frac{30{,}000}{n} \\ &= 7.5 \text{ kHz} \end{aligned}$$

when n=4 (where all four zero crossings are detected).

There is, however, a drawback with this operation in that for smaller frequency offsets, sign is still detectable using the detectors 202 and 204, but the measured magnitude will be more adversely affected by noise than with the implementation of FIG. 5. The reason for this is that, although the clockwise and counter-clockwise rotations for noise are equally likely, they all sum up in the same sense with the zero-crossing detector 206 and have a greater contribution to the detected magnitude in comparison to the actual magnitude.

Figure 7:
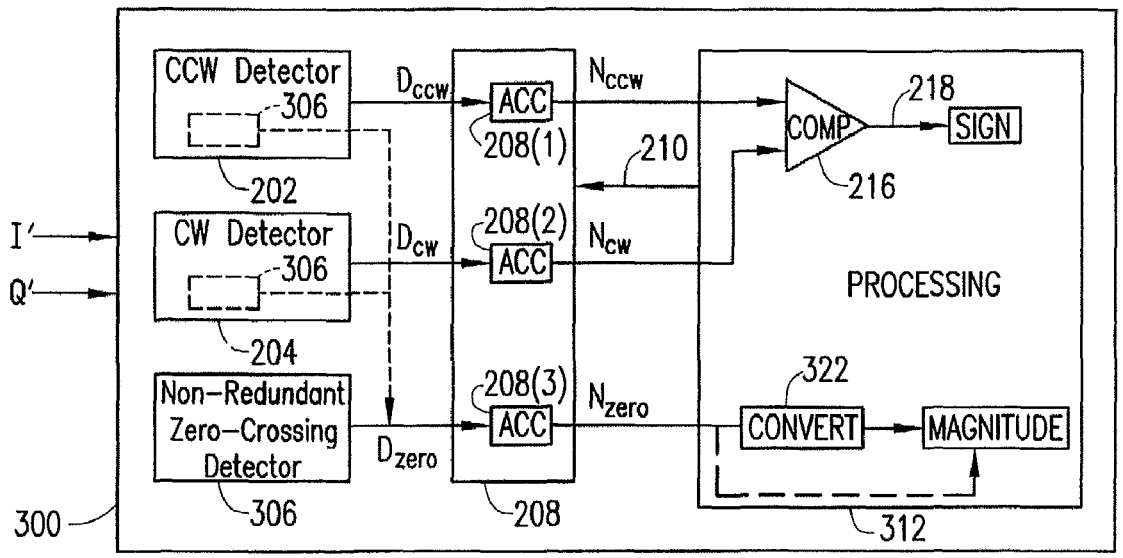
FIG. 7 is a block diagram of a frequency offset detector in accordance with a third embodiment of the present invention.

Reference is now made to FIG. 7 wherein there is shown a block diagram of a frequency offset detector 300 in accordance with a third embodiment of the present invention. In this implementation, the detectors 202 and 204, and processor 212 operation for sign determination, are the same as with FIG. 6. The detector 300, however includes a modified, non-redundant counting, zero-crossing detector 306. The zero-crossing detector 306 implements a zero-crossing detection portion (for example, the first {−} portion shown above) of any one or more of the transition detection logical expressions noted above (or their equivalents). More specifically, the detection is implemented in a non-redundant manner. It will be remembered the same zero-crossing expressions are used in both the clock-wise and counter-clockwise directions, but are reshuffled. These expressions are, therefore, directionally-independent, and the zero-crossing detector 306 counts just once (instead of twice as in the implementation of FIG. 6)

for each crossing. For example, the expressions for the crossing transitions are as follows:

a) I'(k−1) AND NOT(I'(k))

b) Q'(k−1) AND NOT(Q'(k))

c) NOT(I'(k−1)) AND I'(k)

d) NOT(Q'(k−1)) AND Q'(k).

With respect to magnitude, the count $N_{zero}$ of the zero-crossing accumulator 208(3) is indicative of offset magnitude and may be directly used for other operations such as offset correction. Alternatively, the processing component 312 may convert 322 the count $N_{zero}$ of the zero-crossing accumulator 208(3) into a frequency magnitude by recognizing that the number of zero-crossings during the given time period is proportional to the frequency offset in accordance with:

$$\Delta f = \frac{N_{zero}/n}{t}$$
$$= \frac{N_{zero} * R_b}{n * N_{bits}}$$

wherein: $R_b$ is the bit rate on a single QPSK component I' or Q' (i.e., the symbol rate, or the sampling rate);
$N_{bits}$ is the number of processed I' or Q' bits during the time period (i.e., the number of processed symbols); and
n is the number of zero-crossing transitions monitored by the detector 306 (for example, if only the a) crossing was monitored, then n=1).

Again, the conversion to produce the frequency offset comprises a multiplication by a constant.

This implementation likewise provides an improvement in the maximum measurable frequency offset (in comparison to the embodiment of FIG. 5). In this case, however, each crossing counts only once. It is still possible, however, that during one sample change, both I' and Q' may change their sign, which would give a Nyquist frequency that is twice as high as that provided with the embodiment of FIG. 5 (where an event was measured by the combination of (1) and (2) which precludes both I' and Q' from changing). The higher Nyquist frequency in essence doubles the maximum frequency offset that can be detected. This can be better understood by reference to a specific example. It is recognized that the maximum frequency offset occurs when $N_{zero}$ increases by n/2 for each signal sample (where n is the number of matching zero-crossing detections that are utilized). Take an implementation of the present invention in a UMTS-FDD common pilot channel (C-PICH) scenario where sampling occurs at a rate of 15 kHz. Thus, the time period t contains Ns number of symbols (Ns=t*15,000). The maximum rate of change of $N_{zero}$ is thus n*Ns/2 zero-crossings in one direction over the time period t. By replacing $N_{zero}$ by n*Ns/2=n*t*15,0000/2 in the frequency offset formula set forth above, the following maximum frequency offset (Maxf) calculation results:

$$\max f = \frac{\frac{n*Ns}{2}/n}{t}$$
$$= \frac{n*t*15{,}000}{2n*t}$$

$$= \frac{15{,}000}{2}$$
$$= 7.5 \text{ kHz}$$

showing that the maximum frequency offset is still no longer tied to the value of n as with the FIG. 5 implementation and provides equivalent range performance to the implementation of FIG. 6.

Figure 8:
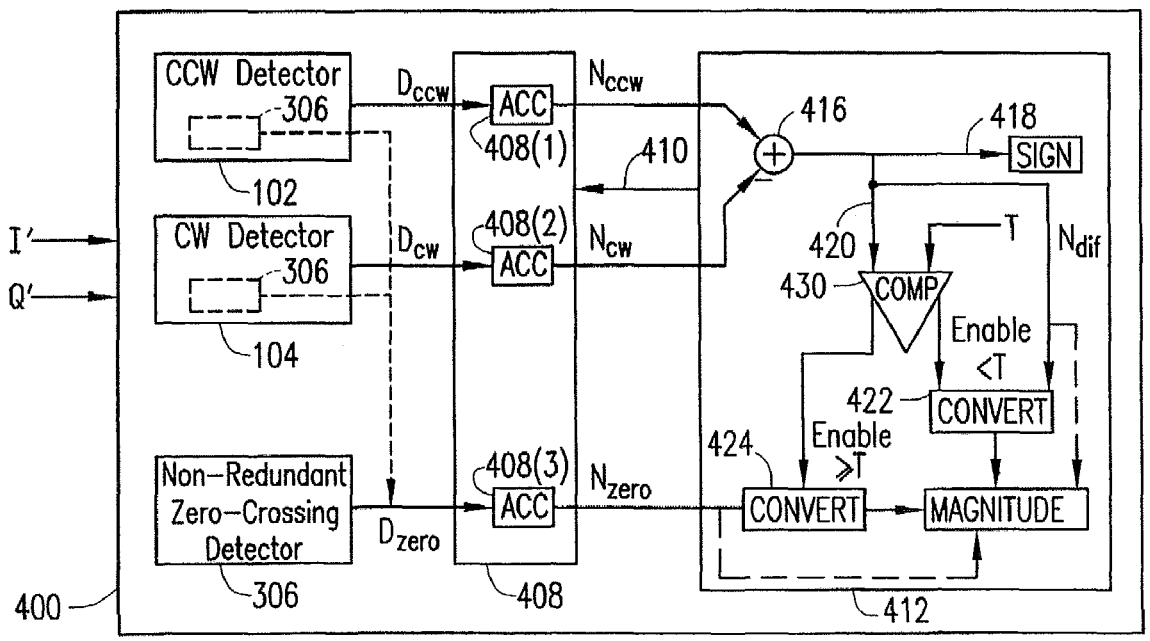
FIG. 8 is a block diagram of a frequency offset detector in accordance with a fourth embodiment of the present invention.

Reference is now made to FIG. 8 wherein there is shown a block diagram of a frequency offset detector 400 in accordance with a fourth embodiment of the present invention. The detector 400 essentially combines the functionality of the first and third embodiments (see, FIGS. 5 and 7). The detector 400 includes a counter-clockwise transition detector 102 and a clockwise transition detector 104 as described above in FIG. 3. The detector 400 still further includes a modified, non-redundant counting, zero-crossing detector 306 as described above in FIG. 7.

The output from each of the counter-clockwise transition detector 102, the clockwise transition detector 104 and zero-crossing detector 306 is a signal D ($D_{ccw}$ for the detector 102, $D_{cw}$ for the detector 104, and $D_{zero}$ for the detector 306) that when active indicates a detected occurrence of a transition/zero-crossing event for the received signal. Active in this case could comprise either active high (i.e., logical "1") or active low (i.e., logical "0") as desired for a given implementation.

The signals D are accumulated in a counter 408 that includes a counter-clockwise accumulator 408(1) (counting the active signals $D_{ccw}$ over a given time period), a clockwise accumulator 408(2) (counting the active signals $D_{cw}$ over the same given time period), and a zero-crossing accumulator 408(3) (counting the active signals $D_{zero}$ over the same given time period). A reset signal 410 is used to reset the counter 408 at the start of each new time period. The output from the counter 408 at the expiration of each time period is a count N ($N_{ccw}$ for the counter-clockwise accumulator 408(1), $N_{cw}$ for the clockwise accumulator 408(2), and $N_{zero}$ for the zero-crossing accumulator 408(3)) that represents the sum number of occurrences of a detected transition event in each direction and zero-crossing event for the received signal during the given time period.

A processing component 412 receives the counts N and mathematically operates on those counts to determine information that is at least indicative of, if not explicitly defining, the magnitude and sign of the frequency offset. With respect to the sign, the processing component 412 includes a subtractor 416 that subtracts the count $N_{cw}$ of the clockwise accumulator 408(2) from the count $N_{ccw}$ of the counter-clockwise accumulator 408(1). The processing component then examines the sign portion 418 (i.e., the most significant bit) of the subtractor 416 output to identify the sign of the frequency offset. For example, if the sign 418 is positive, then the sign of the frequency offset is also positive. Conversely, if the sign 418 is negative, then the sign of the frequency offset is negative.

With respect to magnitude, the processing component 412 includes a comparator 430 that compares the value portion 420 (i.e., the numerical result of the subtraction $N_{dif}=N_{ccw}-N_{cw}$) of the subtractor 416 output against a threshold value (T). The threshold T may be an selected value, and is preferably set to a small percentage of the number of symbol samples Ns during the time period. More specifically, in accordance with a preferred implementation of the present invention, the threshold T is set to 3% of Ns.

If $N_{dif}$ is less than T, this is indicative of the frequency offset being relatively low. In this scenario, the frequency offset determination scheme of FIG. 5 is implemented. More specifically, the difference value $N_{dif}$ is taken as being indicative of offset magnitude (see, dotted line in FIG. 8) and may be directly used for other operations such as offset correction. Alternatively, the difference value may be converted 422 by the processing component 412 into a frequency magnitude by recognizing that the net number of transitions during the given time period is proportional to the frequency offset in accordance with:

$$\Delta f = \frac{N_{dif}/n}{t}$$
$$= \frac{N_{dif} * R_b}{n * N_{bits}}$$

wherein: $R_b$ is the bit rate on a single QPSK component (I' or Q');

$N_{bits}$ is the number of processed I' or Q' bits during the time period; and n is the number of corresponding quadrant transitions monitored by the detectors 102 and 104 (for example, if only a first to second transition and corresponding second to first transition were monitored, then n=1).

Again, this conversion to produce the frequency offset comprises a multiplication by a constant.

Conversely, if $N_{dif}$ equals or exceeds T, this is indicative of the frequency offset being relatively high. In this scenario, the frequency offset determination scheme of FIG. 7 is implemented. More specifically, the count $N_{zero}$ of the zero-crossing accumulator 408(3) is taken as indicative of the offset magnitude (see dotted line in FIG. 8) and may be directly used for other operations such as offset correction. Alternatively, the processing component 412 then converts 424 the count $N_{zero}$ of the zero-crossing accumulator 408(3) into a frequency magnitude by recognizing that the number of zero-crossings during the given time period is proportional to the frequency offset in accordance with:

$$\Delta f = \frac{N_{zero}/n}{t}$$
$$= \frac{N_{zero} * R_b}{n * N_{bits}}$$

wherein: $R_b$ is the bit rate on a single QPSK component I' or Q' (the symbol rate);

$N_{bits}$ is the number of processed I' or Q' bits during the time period (number of processed symbols); and n is the number of zero-crossing transitions monitored by the detector 306 (for example, if only the a) crossing was monitored, then n=1).

Again, this conversion comprises a multiplication by a constant.

The logical expressions for detecting transitions and zero-crossings may be implemented by the counter-clockwise transition detector, the clockwise transition detector and the zero-crossing detector (of any embodiment shown herein) in any suitable technological manner (for example, in hardware, software, firmware, or the like, including combinations thereof). For example, the logic circuit implementations illustrated in FIGS. 3A-3D and 4A-4D (or equivalents, or simplifications, or combinations) may be utilized if appropriate for the detector application. Alternatively, the logical expressions may be coded in software running as an application, or implemented through the use of a digital signal processor or programmable array. Furthermore, it should be recognized, as discussed above, that the logical expressions for detecting transitions (event (1) AND event (2)) incorporate the logical expressions for zero-crossings (event (2)), and thus a separate physical implementation for zero-crossing detection is not required (this is graphically illustrated by the dotted line functionality within the clockwise and counter-clockwise transition detectors in FIGS. 6-8).

The detection of a corresponding pair of transitions (for example, first to second and second to first, as mentioned above) is sufficient to provide information for making a frequency offset magnitude and direction determination. By increasing the number of transition pairs detected, however, the accuracy of the magnitude determination improves. Thus, if a given implementation of the detector requires a high degree of accuracy in the measured magnitude of the determined frequency offset, the counter-clockwise transition detector and the clockwise transition detector should implement plural (up to the maximum of four if possible) pairs of transition detections.

Figure 9:
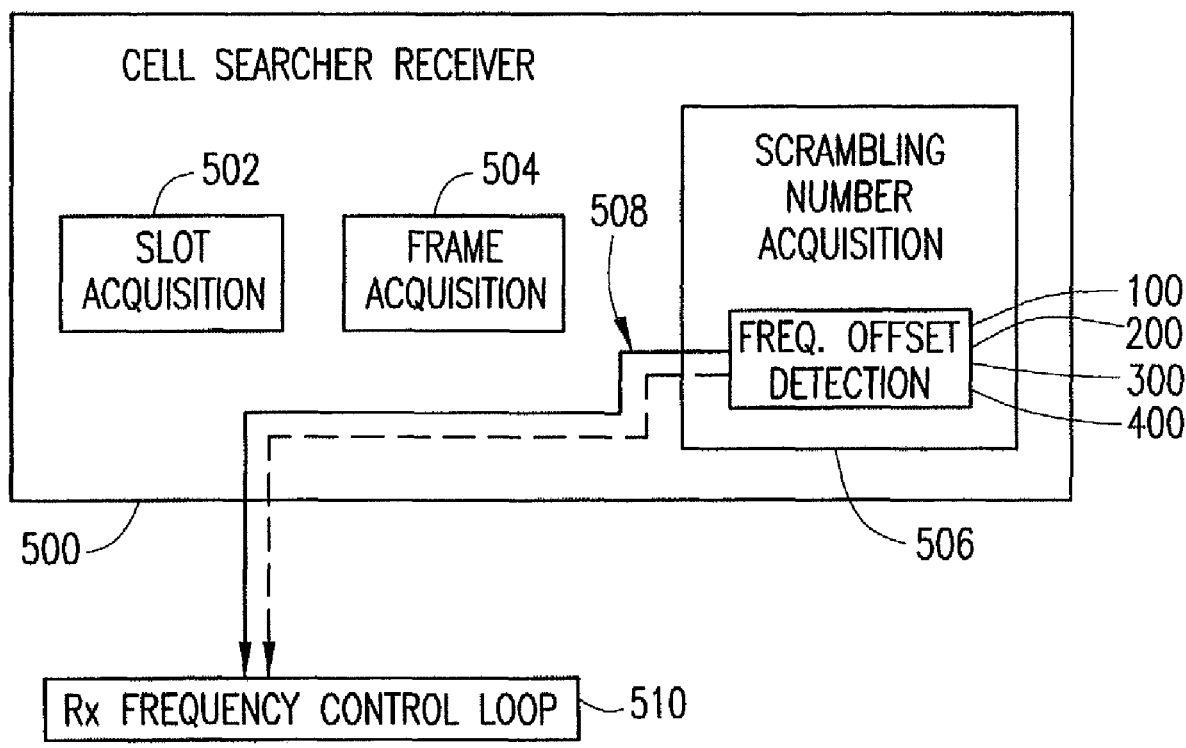
FIG. 9 is a block diagram of UMTS-FDD cell searcher implementing the frequency offset detector of the present invention.

Reference is now made to FIG. 9 wherein there is shown a block diagram of UMTS-FDD cell searcher 500 implementing the frequency offset detector of the present invention. The cell searcher 500 performs signal acquisition in three steps. In a first step (often referred to in the art as "step 1"), slot acquisition (or slot synchronization) 502 is performed. In this step 1 process, the cell searcher 500 synchronizes itself to the time slots of the received signal by detecting the beginnings of each slot through a correlation process where the received signal is correlated against a primary synchronization code. In the second step (often referred to in the art as "step 2"), frame acquisition (or frame synchronization) 504 is performed. In this step 2 process, the cell searcher 500 synchronizes itself to the frame alignment (where a frame comprises 15 consecutive slots) through a correlation process where the received signal at each slot location is correlated against a secondary synchronization code. This frame alignment process not only detects the beginning of the frame, but also detects which sequence of codes are present in the received signal (and thus identifies the scrambling code used by the base station). In the third step (often referred to in the art as "step 3"), base station identification (or scrambling code acquisition) 506 is performed. In this step 3 process, the cell searcher 500 identifies the unique code used by the base station to scramble its transmitted data.

The frequency offset detector (100, 200, 300 and 400) of the present invention is particularly useful in connection with the performance of the step 3 process for base station identification 506. Although any of the detectors shown in FIGS. 5-8 may be used in the cell searcher 500, as a practical matter the detector 400 provides the best accuracy and would be preferred for a UMTS-FDD application. The I and Q (more specifically, the I' and Q') components of the primary common pilot channel (P-CPICH) are retrieved. Although the I and Q components have identical data contents (e.g., all ones), they are different because the scrambling code is complex in nature. So, the CPICH is actually the same as the scrambling code (during one frame). Although the I and Q components differ, they do not need to be retrieved separately, since this is the final step of the signal acquisition phase. Actually, the correct scrambling code is identified by correlating the complex input signal with the conjugate of one of the eight assumed scrambling codes (where this group of eight candidate codes for the actual scrambling code is an outcome of the step 2 process in addition to the frame synchronization). Correlating the complex input signal with the conjugate of an assumed scrambling codes is performed as follows:

$$E=(I'+jQ')^T(Is-jQs)$$

wherein: I' is the "in-phase" signal vector I';
Is is the real part of the assumed scrambling code;
Q' is the "quadrature" signal vector;
Qs is the imaginary part of the assumed scrambling code;
E is the "energy" (i.e., the correlation result); and
T refers to a transposition.

In the presence of phase error ($\Phi$), I' and Q' are:

$$I'=I*\cos(\Phi)/2-Q*\sin(\Phi)/2; \text{ and}$$

$$Q'=I*\sin(\Phi)/2+Q*\cos(\Phi)/2,$$

where I and Q are the original phase components, respectively, and $\Phi$ is the phase offset. In the case of a pilot signal, I and Q contain Is and Qs, respectively. The energy E will have the largest peak when the CPICH (I'+Q') is matched with the true scrambling code candidate (Is_true-j Qs_true), which is the goal of the base station identification 506 (or scrambling code acquisition step). Recognizing again that the CPICH is equal to the scrambling code, this means that I=Is and also that Q=Qs. Thus:

$$E = I'Is + Q'Qs + j(Q'Is - I'Qs)$$

$$E = \frac{1}{2}(I^2\cos\Phi + Q^2\cos\Phi) + \frac{j}{2}(I^2\sin\Phi + Q^2\sin\Phi)$$

recognizing that Is =I and Qs=Q, and further:

$$I^T \cdot Q = I^T \cdot Qs = Q^T I = Q^T Is = 0$$

Thus:

$$|E| = \frac{1}{2}(I^2 + Q^2) = Const,$$

recognizing that $\cos^2 \Phi + \sin^2 \Phi = 1$. The CPICH information can then be considered as retrieved where it is constant on observed intervals. Nonetheless, in the presence of a frequency offset this supposedly constant value varies with time. The frequency offset process of the present invention (references 100, 200, 300 and 400 in FIGS. 5-8)) takes into account the phase components I'Is_true and Q'Qs_true, referred to herein as I' and Q', respectively, which already had to be computed for finding the correlation peak (value E). By estimating the number of "sector crossings" in I' and Q' (more precisely, I'Is and Q'Qs), the present invention computes the frequency offset (solid line) or information indicative of the frequency offset (dotted line). This information (sign and magnitude) can then be fed back 508 to the automatic frequency control loop 510 of the receiver to improve its operation.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A frequency error system for measuring a sign and magnitude of a carrier frequency error in a received complex signal, comprising:
    a first detector operating to detect at least one quadrant transition of the received complex signal in a first rotation direction;
    a first accumulator that accumulates a number of first rotation direction quadrant transitions detected by the first detector during a time period;
    a second detector operating to detect at least one corresponding quadrant transition of the received complex signal in a second, opposite, rotation direction;
    a second accumulator that accumulates a number of second, opposite, rotation direction quadrant transitions detected by the second detector during the same time period; and
    a subtractor that subtracts from the accumulated first rotation direction quadrant transitions the second, opposite, rotation direction quadrant transitions to obtain a difference value, a sign of that difference value being indicative of the carrier frequency error sign and a magnitude of that difference value being indicative of the carrier frequency error magnitude.

2. The system as in claim 1 further including a processing component to calculate the frequency error magnitude by dividing the difference value by the time period.

3. The system as in claim 2 wherein the first and second detectors each detect two corresponding quadrant transitions, and wherein the processing component calculates the frequency error magnitude by dividing the difference value by two times the time period.

4. The system as in claim 2 wherein the first and second detectors each detect four corresponding quadrant transitions, and wherein the processing component calculates the frequency error magnitude by dividing the difference value by four times the time period.

5. The system as in claim 2 wherein the processing component resets the first and second accumulators at the end of each time period.

6. The system as in claim 1 wherein the received complex signal is quantized by a single I bit and a single Q bit, and wherein the first and second detector operate to detect quadrant transitions by examining the single bits.

7. The system as in claim 6 wherein the quantized single I and Q bits are sign bits of the I and Q components of the received complex signal.

8. The system of claim 1 wherein the received complex signal is a PSK signal.

9. The system of claim 8 further comprising a receiver frequency control loop responsive to the frequency error sign and frequency error magnitude for correcting the frequency error in the received complex PSK signal.

10. A cell searcher, comprising:
    a slot acquisition component for correlating a received PSK signal against a slot synchronization code;
    a frame acquisition component for correlating the received PSK signal at each slot location against a frame synchronization code;
    a scrambling code acquisition component for correlating a unique scrambling code against the received PSK signal, the scrambling code acquisition component including an error detector for measuring a sign and magnitude of a carrier frequency error in the received signal by processing phase components of the unique scrambling code correlation; and a receiver frequency control loop whose frequency operation is adjusted by the measured carrier frequency error sign and magnitude.

11. The cell searcher as in claim 10 wherein the error detector comprises:

a first detector operating to detect at least one quadrant transition of the received PSK signal in a first rotation direction;

a first accumulator that accumulates a number of first rotation direction quadrant transitions detected by the first detector during a time period;

a second detector operating to detect at least one corresponding quadrant transition of the received PSK signal in a second, opposite, rotation direction; and a second accumulator that accumulates a number of second, opposite, rotation direction quadrant transitions detected by the second detector during the same time period.

12. The cell searcher as in claim 11 wherein the error detector further comprises:

a circuit that determines a difference between the accumulated first rotation direction quadrant transitions the second, opposite, rotation direction quadrant transitions to obtain a difference value, a sign of that difference value being indicative of the frequency error sign and a magnitude of that difference value being indicative of the frequency error magnitude.

13. The cell searcher as in claim 11 wherein the error detector further comprises:

a third detector operating to detect at least one zero-crossing of the received PSK signal; and a third accumulator that accumulates a number of zero-crossings detected by the third detector during the same time period.

14. The cell searcher as in claim 13 wherein the error detector further comprises:

a comparator that compares the accumulated counter-clockwise first rotation direction quadrant transitions and second, opposite, rotation direction quadrant transitions, the larger of those accumulated transitions being indicative of the frequency error sign;

wherein the accumulated zero-crossings are indicative of the frequency error magnitude.

15. The cell searcher as in claim 13 wherein the error detector further comprises:

a subtractor that subtracts from the accumulated first rotation direction quadrant transitions the second, opposite, rotation direction quadrant transitions to obtain a difference value, a sign of that difference value being indicative of the frequency error sign; and a comparator that compares the difference value to a threshold, a magnitude of that difference value being indicative of the frequency error magnitude if the threshold is not exceeded, and the accumulated zero-crossings being indicative of the frequency error magnitude if the threshold is exceeded.

16. A method for measuring a sign and magnitude of a carrier frequency error in a received complex signal, comprising:

detecting at least one quadrant transition of the received complex signal in a first rotation direction;

accumulating a number of first rotation direction quadrant transitions during a time period;

detecting at least one corresponding quadrant transition of the received complex signal in a second, opposite, rotation direction;

accumulating a number of second, opposite, rotation direction quadrant transitions during the same time period;

subtracting from the accumulated first rotation direction quadrant transitions the second, opposite, rotation direction quadrant transitions to obtain a difference value;

providing a sign of that difference value as being indicative of the carrier frequency error sign; and providing a magnitude of that difference value being indicative of the carrier frequency error magnitude.

17. The method as in claim 16 further including the step of adjusting carrier frequency setting of a receiver carrier frequency control loop in accordance with the provided sign and magnitude.

18. The method as in claim 16 wherein the step of providing a magnitude comprises the step of calculating a value proportional to the frequency error magnitude by dividing the difference value by the time period.

19. The method as in claim 16 wherein the received complex signal is quantized by a single I bit and a single Q bit, and wherein the detecting steps detect quadrant transitions by examining the single bits.

20. The method as in claim 19 wherein the quantized single I and Q bits are sign bits of the I and Q components of the received complex signal.

21. The method of claim 16 wherein the received complex signal is a PSK signal.

\* \* \* \* \*